United States Patent Office 2,806,729
Patented Sept. 17, 1957

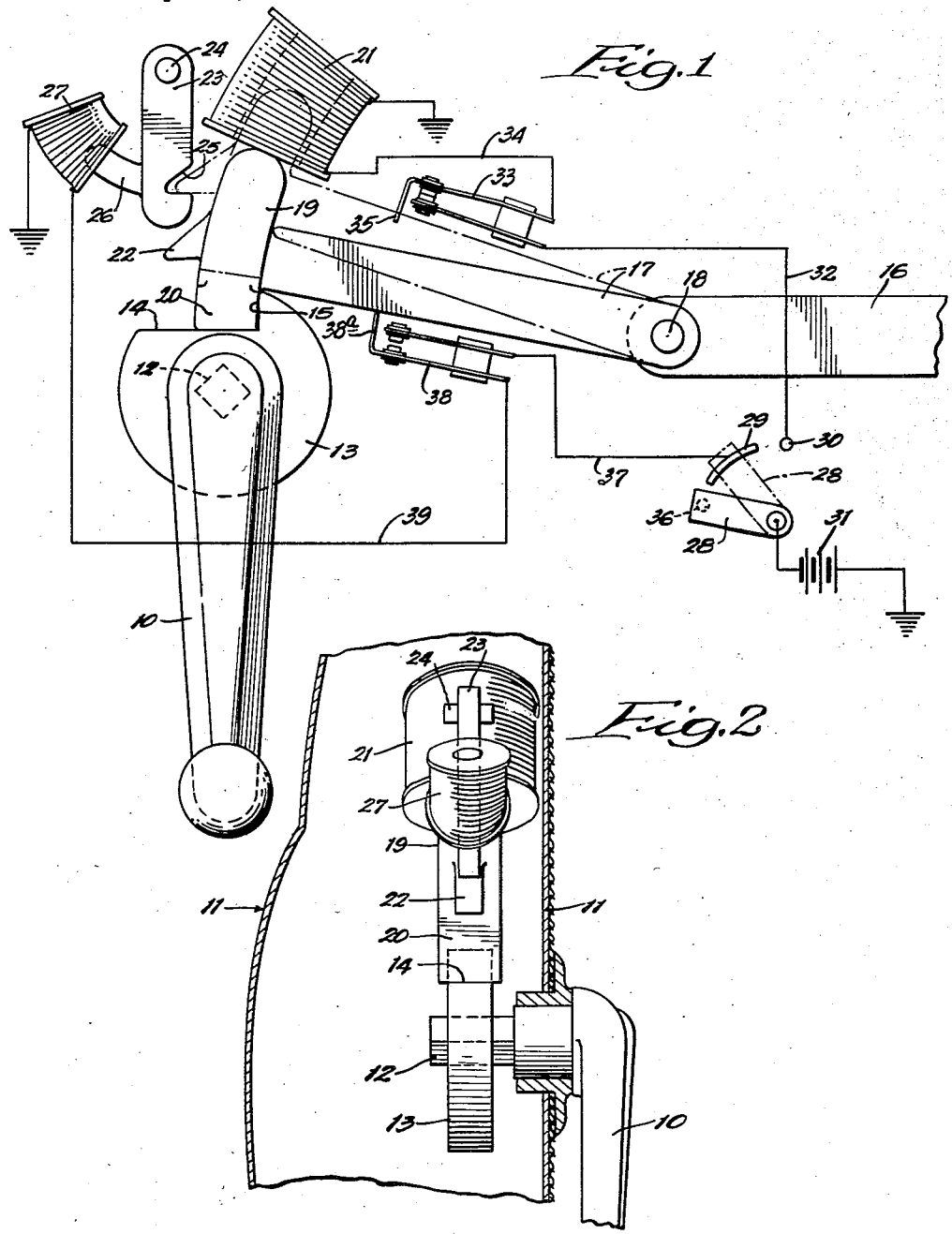
Sept 17, 1957     E. L. WHIPPLE     2,806,729
ELECTRICALLY-CONTROLLED SAFETY LOCK
Filed Sept. 27, 1952     3 Sheets-Sheet 1
INVENTOR:
Edson L. Whipple,
BY
Dawson, Tilton & Graham,
ATTORNEYS

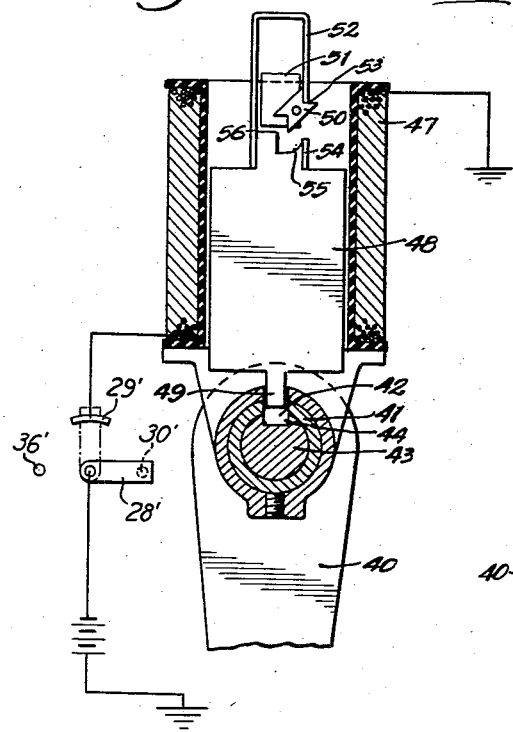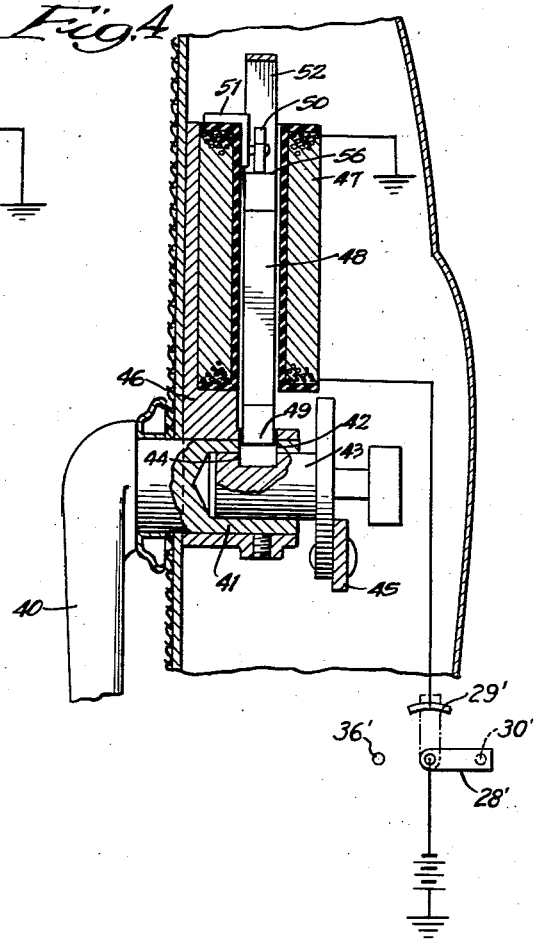

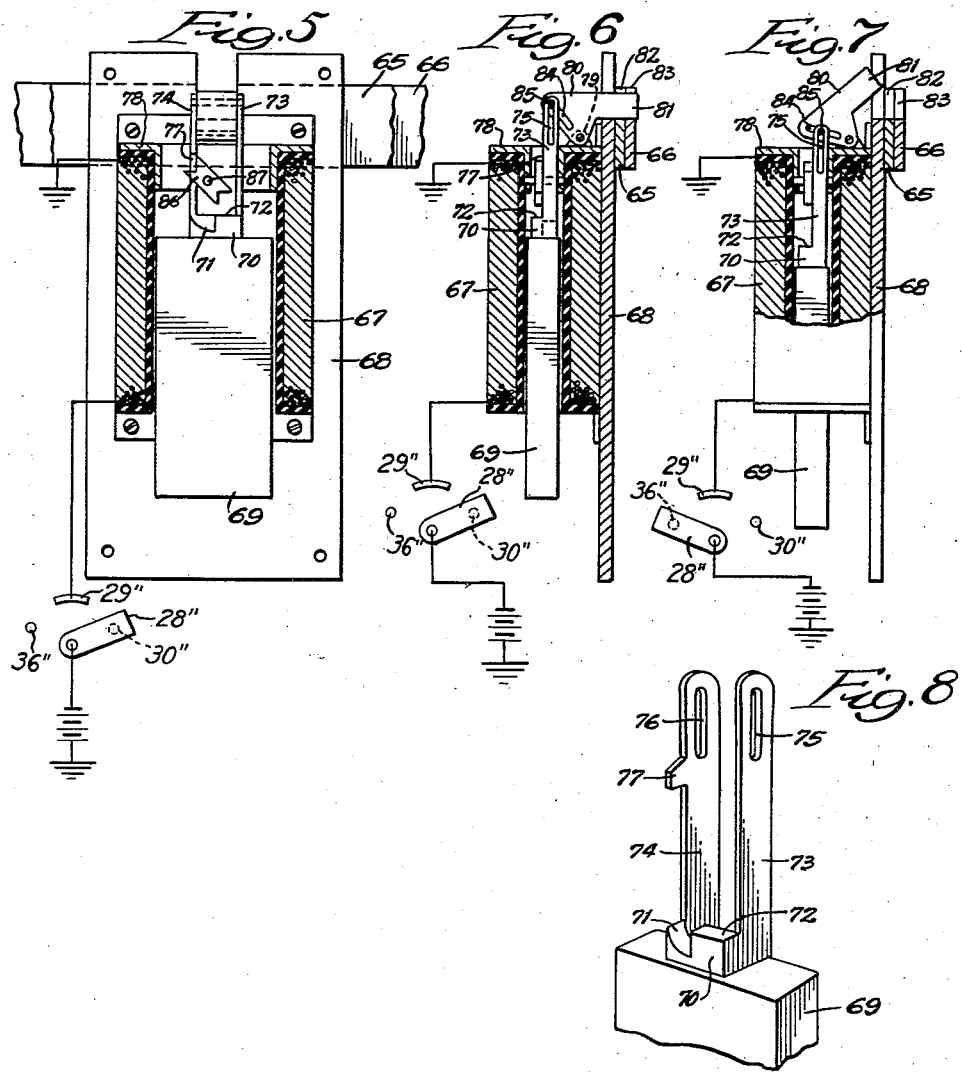

2,806,729

ELECTRICALLY-CONTROLLED SAFETY LOCK

Edson L. Whipple, St. Louis, Mich.

Application September 27, 1952, Serial No. 311,824

3 Claims. (Cl. 292—336.3)

This invention relates to an electrically-controlled safety lock, and more particularly to a safety lock on doors for compartments, as, for example, for automobile doors and other vehicle doors.

Severe accidents have occurred in automobiles and other moving vehicles equipped with doors when such doors have been accidentally opened during movement of the vehicles. There has long been a need for safety locks which may be easily controlled from the driver's position or from other remote switches maintained in the vehicle or compartment which will keep the doors securely locked against such accidental opening when the vehicle is in motion but will allow easy and convenient use of the doors for loading and unloading passengers when the car is not in motion.

An object of the present invention is to provide an electrically-controlled safety lock adapted to accomplish the above purposes. A further object is to provide a locking mechanism which can be operated at will from a remote position for keeping the vehicle door or certain doors thereof securely fastened when a switch is turned to one position, but allowing the door or doors to be readily opened whenever said switch is turned to another position. A further object is to provide such a mechanism which may be controlled by the ignition switch. Yet another object is to provide in such a structure an inside handle which is selectively made operative and inoperative by automatically-controlled latch mechanism and which is disengaged from the latch mechanism or made inoperative during the time the ignition switch or any control switch is in "on" position. A still further object is to provide a compact structure in which one solenoid or electrical device performs both the operation of withdrawing or inserting the latch or of rendering the handle engaged or disengaged for operating the door latch. Still another object is that of providing a safety locking mechanism wherein a structure controlled by a single solenoid is effective to render both the inner and outer door handles inoperative. Other specific objects and advantages will appear as the specification proceeds.

The invention is shown, in illustrative embodiments, by the accompanying drawings, in which—

Figure 1 is a side view in elevation of an automobile door handle and control means cooperating therewith in accordance with my invention; Fig. 2, an enlarged, broken, sectional view of the structure shown in Fig. 1; Fig. 3, a broken sectional view showing a modified form of mechanism for connecting a handle to the latch bar; Fig. 4, a vertical sectional view of the structure shown in Fig. 3 mounted within the door of an automobile; Fig. 5, a broken, sectional view showing another modification of the invention; Fig. 6, a vertical sectional view of the embodiment illustrated in Fig. 5 and in which the plunger is in latch-locking position; Fig. 7, a vertical sectional view similar to that of Fig. 6 but showing the plunger in latch-releasing position; Fig. 8, an enlarged, perspective view of the assembly carried by the solenoid coil for actuating the plunger.

In the illustration given in Figs. 1 and 2, 10 designates a handle mounted in a door 11 of an automobile. The handle is equipped with a square bolt 12 received within the square opening of a cylinder 13. The cylinder, as shown more clearly in Fig. 1, is cut away at 14 to provide a shoulder 15. A latch bar 16 is slidably mounted in the door and is adapted to release the latch or catch therein that secures the door in closed position. Since such mechanism is well-known, a detailed description herein is believed unnecessary.

Pivotally connected to the latch bar 16 is a connector member or bar 17. The member is connected to the bar 16 by a pivot 18. At the forward end of the member 17 is a metallic core 19 of high magnetic permeability. The core 19 is provided with a lower portion 20 adapted to engage the shoulder 15 of the cylinder 13 on the bolt 12, so that when the handle is turned, the member 17 is drawn forward slightly to actuate the latch bar 16 and thus effect the unlatching of the door.

Above the core 19 is mounted a solenoid coil 21. The coil or toroidal portion of the solenoid is large enough in diameter to receive the core 19, thus permitting the core to be drawn upwardly into the coil when the coil is energized.

The core 19 is provided with a hook 22 adapted to engage a pivotally-mounted strap 23, mounted by pivot 24 upon the door, the strap 23 being provided with a notch 25 adapted to receive the hook 22 of core 19. Thus when the core 19 is swung upwardly, the cammed upper portion of the hook 22 moves the strap 23 laterally until the hook is above or in engagement with the notch 25. When the solenoid is deenergized, the hook falls downwardly to rest upon the bottom of the notched portion 25. In this manner, the core 19 is held in suspended position even when the solenoid coil 21 is deenergized.

I also provide means for swinging the strap 23 laterally to disengage it from the hook 22. In the illustration given, the strap 23 is provided with a laterally-extending metallic member 26 adapted to enter the solenoid 27 when the same is energized.

Any suitable circuit may be employed for connecting the various parts shown. In the illustration given, I provide a switch 28 adapted to be swung over the arcuate contact 29 to an "on" contact position at 30. The switch is shown connected to a battery 31 or to any other suitable source. When the switch 28 is swung to a position in engagement with the contact 30, current passes from the battery through the switch contact 30 and lead 32 to a second switch 33 from which the current passes through lead 34 to the solenoid 21. The switch 33 is provided with a depending portion 35 bringing about an opening of the switch when the connector member 17 is raised. When the member 17 is in the raised locking position, as shown in Fig. 1 by dotted lines, and the switch 28 is swung into engagement with the "off" contact 36 as shown in Fig. 1, a current is passed through the switch 28 and lead 37 to a switch 38 as the sliding contact of the switch 28 passes over the elongated contact 29. When the switch 38 is closed, the current passes through the switch and thence through lead 39 to the solenoid 27. The switch 38 is provided with an arm 38a engaged by the member 17, when it is in lowered position, to open the switch 38 and deenergize the solenoid 27.

In the operation of the structure, with the door in closed position, the operator swings the switch 28 into engagement with the contact 30, thus energizing the solenoid 21. The connector member 17 is raised to the position shown in dotted lines in Fig. 1, and the door handle 10 is then free to rotate without effecting in any way the release of the latch bar 16. The solenoid 21 is self-extinguishing because of the provision of the switch 33 which is opened when the member 17 is in raised position causing a cessation of current flow through the lead 32 and solenoid 21, and the core 19 is released. However, the hook 22 of core 19 now engages the notch 25 in latch strap 23 and the connector member is held in raised position.

To release the locking mechanism, the switch is swung to the position shown in Fig. 1, and in moving from the contact 30 to the contact 36 the switch engages contact member 29 and current flows through the lead 37, switch 38, and lead 39 to the solenoid windings 27, thus energizing the solenoid and drawing the member 26 into the solenoid and swinging the strap 23 away from the hook 22. The connector member then falls to the position shown in Fig. 1 and movement of the handle will cause a slight movement of the latch bar 16 to effect release of the door lock. The switch 38 makes the solenoid 27 self-extinguishing since the member 17, when in the lower or latching position, engages the arm 38a and opens the switch 38.

If desired, the entire coil assembly, etc., may be slidably mounted in the door 11 so as to move with the latching bar 16 and connector 17.

The switch mechanism employed may be the ignition of the automobile or other vehicle, or it may be any other switch located in the vehicle compartment at a remote point from the door or doors which are controlled. In the modification shown in Figs. 3 and 4, the door handle 40 is provided with a tubular portion 41 having a vertical slot 42 therein. Within the tubular portion 41 is a cylindrical member 43 provided with a slot 44 aligned with the slot 42 in the sleeve 41. The cylindrical member 43 is connected to a latch bar 45 for releasing the lock of the car. Since the latter mechanism is of well-known construction, a detailed description is believed unnecessary. A spring (not shown) normally urges the handle 40 to a position bringing the slots 42 and 44 into alignment.

Mounted upon the barrel or tubular member 41 is a support 46 fixedly carried by the door panel and extending above the handle and supporting a solenoid 47. Mounted within the solenoid 47 is a core member 48 having a depending plunger 49 adapted to enter the slots 42 and 44 of members 41 and 43 to secure the two together. When the plunger 49 is in lowered position engaging the slots 42 and 44, the handle is secured to the cylindrical member 43 and upon rotation of the handle, movement of the latch bar 45 is brought about to effect release of the door latch (not shown).

Mechanism is provided for holding or latching the movable core 48 in raised position even when the solenoid is deenergized, while also permitting the plunger 49 to return to its lowered position after a subsequent energization of the solenoid. In the illustration given, I provide a rotary latch member or stop-rest 50 which is pivotally mounted upon an angle member 51 supported upon the solenoid casing carried by the support 46. Secured to the solenoid core 48 is a metal strap 52 which extends upwardly and then downwardly to provide a latch point 53 adapted to engage the rotary stop-rest 50. The solenoid core 48 is also provided with an upwardly-extending member 54 providing a cam surface 55 and a generally horizontal upper surface 56.

In the operation of the structure shown in Figures 3 and 4, a momentary switch 28' is employed. When this switch engages the arcuate contact 29' as it is moved between an "off" position against contact 36' and an "on" position against contact 30', the solenoid 47 is energized and the core 48 moves upwardly so that the depending plunger 49 is at least above the rotary member 43. If the stop-rest 50 is in a vertical position (with a vertical edge thereof engaging the depending strap 52) as the core begins its upward movement, it will remain in that position until the strap clears the rotary stop-rest and one of the lower corners of the rest contacts the cam surface 55. As the cam surface 55 strikes the rotary stop-rest, it swings the stop-rest in a clockwise direction (as viewed in Figure 3). Then, as the switch moves onto the "on" position, the circuit of the solenoid is thus broken, the core 48 makes a slightly downward movement and the edge 53 of the strap 52 engages the rotary stop-rest latch and partly moves the latch further in a clockwise direction, and finally locks between the upper prongs of the rotary latch. The rotary latch 50 thereby securely supports the core 48 in the raised position illustrated in Figure 3. If it is now desired to turn off the ignition switch by swinging the switch over the momentary contact 29' and into "off" position, the solenoid 47 is again momentarily energized and the core 48 moves upwardly a certain distance with the horizontal face 56 engaging a lower prong of the rotary stop latch 50. This upward movement of the core again swings the latch in a clockwise direction to free the support edge 53 from engagement with the latch so that, when the switch has been moved to a fully "off" position and the solenoid thereby de-energized, the entire core can move downwardly, thus allowing the locking plunger 49 to enter the slots 42 and 44 of members 41 and 43, respectively.

At the same time the core moves downwardly, support edge 53 engages the rotary stop-latch and swings it clockwise into its original vertical position along the depending portion of strap 52. With the locking plunger 49 disposed in both of the aligned slots 42 and 44, movement of the handle will effect a turning of the cylindrical member 43 and a slight movement of this handle causes the latch bar 45 to release the lock of the door. Since the support structure 46 carrying the solenoid and other parts is mounted upon the tubular portion 41 of the handle, all such parts are free to move through an arc within the hollow door as the handle is rotated to release the lock.

Summarizing, assume first an initial condition wherein the plunger 49 is in locking position with the slots 42 and 44, the solenoid is energized and core 48 is thereby moved upwardly to withdraw plunger 49 from the slots. The solenoid is then de-energized and strap 52 engages latch 50 whereby core 48 is held in raised position with plunger 49 free of the slots 42 and 44. To again engage plunger 49 with the slots, the solenoid is again energized and the core is thereby moved upwardly slightly so that the latch 50 is rotated, whereupon the next de-energizing of the solenoid the core 48 drops downwardly to engage the plunger 49 within the slots 42 and 44.

In the foregoing operation, it will be noted that a single solenoid is effective for performing the engaging and disengaging operations and for bringing about an operation of the rotary latch. The mechanism is compact and supported within a small area above the handle and inside the hollow door.

In the modification illustrated in Figs. 5 through 8, the mechanism is similar both in structure and operation to the embodiments shown in Figs. 3 and 4. Latching bars 65 and 66 are slidably mounted in the door of a vehicle and are operative to release the door latch. Each of the bars 65 and 66 is equipped with a handle and moves longitudinally to actuate the door latch upon movement of the handle members. In certain constructions one of the latching bars—for example bar 65—responds to movement of an inner door handle to unlatch the door while the other bar—66—is actuated by movement of the outer handle of the door to operate the door latch.

A solenoid 67 is mounted upon an inner panel 68 of a vehicle door by any suitable means such as the screws illustrated. The solenoid 67 is equipped with a movable core 69 that moves axially within the solenoid coils upon energizing of the solenoid. The core 69 is provided with an upwardly-extending member 70 providing a cam surface 71 and a generally horizontal upper surface 72 that is preferably inclined at an angle of about 5 degrees from the horizontal for the reasons hereinbefore brought out.

Formed integrally with the member 70, or otherwise rigidly fixed thereto, are a pair of spaced supports 73 and 74 equipped respectively at their upper ends with elongated slots 75 and 76. The support 74 provides a laterally-extending ear 77 intermediate its ends and extending forwardly. The ear 77 is a latch point that operates in a manner similar to the latch point 53 discussed with reference to Figs. 3 and 4.

Mounted within the solenoid 67 at the upper end thereof is a bezel or support member 78 equipped near the inner panel 68 with an ear or lug 79. Pivotally mounted upon the lug 79 is a plunger 80 having an elongated portion 81 extending through a slot in the panel 68. The portion 81 is adapted to be received in recesses 82 and 83 provided by the latching bars 65 and 66. The recesses 82 and 83 are aligned when the handles of the door are in their ordinary released position and receive the portion 81 of the plunger when so aligned.

The bezel or support 78 is rigidly fixed to the panel 68 so that the plunger 80 is held against movement in the directions in which the latching bars 65 and 66 move to operate the door latch. The plunger 80 is equipped with an upwardly- and forwardly-inclined slot 84 that slidably receives a pin 85 that is also slidably carried by the support members 73 and 74 in their respective elongated slots 75 and 76. It is seen that movement of the core 69 within the solenoid operates to pivot the plunger 80 about the lug 79 so as to position the plunger within the recesses 82 and 83 in the latching bars 65 and 66.

Mechanism is provided for holding or latching the movable core 69 in raised position even when the solenoid is deenergized, while also permitting the plunger 80 to return to its retracted position after the subsequent energization of the solenoid. In the illustration given, I provide a rotary latch member or stop-rest 86 which is pivotally mounted upon a pin 87 rigidly carried by the bezel 78.

In operation of the structure shown in Figs. 5 through 8, a momentary switch 28″ such as illustrated in Figs. 3 and 4 is employed. As the switch is moved between its "off" position against contact 36″ and its "on" position against contact 30″, it engages contact 29″ and solenoid 67 is thereby momentarily energized. When the solenoid is energized, core 69 moves upwardly so that the plunger 80 is pivoted into the recesses 82 and 83 by interaction of the slots 75 and 76 in the support members 73 and 74, the pin 85, and the slot 84 provided in the plunger. The latching bars 65 and 66 are thereby locked against movement and the vehicle door cannot be opened by either the inner or outer handle thereof. As the core 69 moves upwardly, the cam surface 71 engages one of the corners of the rotary stop-rest 86 and swings it laterally in a counterclockwise direction. Then as the switch is swung to the "on" position and the circuit of the solenoid 67 is broken, the core 69 makes a slight downward movement and the ear or latch point 77 engages the rotary stop latch and partly moves the latch further in a counterclockwise direction. This brings the lower prong of the rotary stop latch over the horizontal portion 72 of the member 70. In this position the rotary latch 86 securely supports the core 69 in the raised position illustrated in Fig. 6.

To release the safety lock mechanism, the momentary switch 28 is turned to the "off" position and the solenoid 67 is momentarily energized and operates in the same manner as is fully described with reference to the operation of the structure illustrated in Figs. 3 and 4.

While I have shown in the specific description given, types of structure to which the handles or release members are secured, it will be understood that such members may be modified widely for different types of vehicles or other structures to meet the requirements of the particular device to which the safety lock is attached. Further, the control switches which may be employed may be in connection with certain switches such as ignition switches, or may be entirely independent of them, and may be located in various positions for control within the vehicle, etc. In the case of an automobile, the driver door may be ordinarily left uncontrolled by the safety mechanism, and the remaining doors controlled through a single switch adjacent the driver.

While in the foregoing specification I have set forth specific structures in considerable detail for the purpose of illustrating embodiments of the invention, it will be understood that such details of structure may be varied widely by those skilled in the art without departing from the spirit of my invention.

I claim:

1. In a vehicle having doors equipped with latches and a handle on at least one of said doors equipped with a latch bar for operating the latch thereof, a connector member for connecting said bar and handle when said member is in lowered position and for disconnecting said handle and bar when said member is in raised position, a solenoid above said handle and adapted, when energized, to draw said connector member upwardly and away from said handle, and a rotary stop-latch member for supporting said connector member in such raised position after said solenoid is deenergized, said connector member being released by said stop-latch member when said solenoid is deenergized following a subsequent energization thereof to permit that connector member to move into operative position.

2. In a door lock structure having a latch movable between release and close positions to afford opening and closing of a door equipped therewith, a plunger biased into interlocking engagement with said latch for inhibiting movement thereof into release position and being selectively movable out of such interlocking engagement, electric means for moving said plunger into a position of release with respect to said latch, and a stop-latch mechanism sequentially operable in the successive periods of de-energization of said electric means that follow successive energizations thereof to alternately constrain said plunger from interlocking engagement with said latch and to release the plunger for interlocking engagement with the latch, said stop-latch mechanism comprising a rotary latch, an arm carried by said plunger and engageable with said rotary latch in one position thereof, and a cam also carried by said plunger for engagement with said rotary latch to selectively cam it, respectively on alternate engagements therewith, into a position wherein it is engaged by said arm to support said plunger and into a position wherein it is not engaged by the arm so that the plunger is in a condition of release with respect thereto.

3. In a door lock structure having a latch movable between release and close positions to afford opening and closing of a door equipped therewith, a plunger biased into interlocking engagement with said latch for inhibiting movement thereof into release position and being selectively movable out of such interlocking engagement, a solenoid for moving said plunger into a position of release with respect to said latch, said plunger comprising at least a core portion of said solenoid, and a stop-latch mechanism sequentially operable in the successive periods of de-energization of said electric means that follow successive energizations thereof to alternately constrain said plunger from interlocking engagement with said latch and to release the plunger for interlocking engagement with the latch.

References Cited in the file of this patent

UNITED STATES PATENTS

| | | |
|---|---|---|
| 1,262,435 | Berg | Apr. 9, 1918 |
| 1,970,807 | Lovell | Aug. 21, 1934 |
| 2,001,787 | Lakin | May 21, 1935 |
| 2,103,702 | Tibbetts | Dec. 28, 1937 |
| 2,371,370 | Ward | Mar. 13, 1945 |
| 2,427,040 | Billman | Sept. 9, 1947 |
| 2,453,505 | Fornwald | Nov. 9, 1948 |
| 2,459,029 | Ingres et al. | Jan. 11, 1949 |